United States Patent
McNally et al.

(10) Patent No.: US 10,719,967 B2
(45) Date of Patent: Jul. 21, 2020

(54) TECHNIQUES FOR PLACING MASKING WINDOW OBJECTS IN A COMPUTER-GENERATED SCENE FOR STEREOSCOPIC COMPUTER-ANIMATION

(71) Applicant: DreamWorks Animation LLC, Glendale, CA (US)

(72) Inventors: Philip McNally, Eagle Rock, CA (US); Matthew Low, Santa Monica, CA (US)

(73) Assignee: DreamWorks Animation L.L.C., Universal City, CA (US)

( * ) Notice: Subject to any disclaimer, the term of this patent is extended or adjusted under 35 U.S.C. 154(b) by 1502 days.

(21) Appl. No.: 13/802,671

(22) Filed: Mar. 13, 2013

(65) Prior Publication Data

US 2014/0036037 A1 Feb. 6, 2014

Related U.S. Application Data

(60) Provisional application No. 61/678,568, filed on Aug. 1, 2012.

(51) Int. Cl.
*H04N 13/00* (2018.01)
*G06T 13/20* (2011.01)
(Continued)

(52) U.S. Cl.
CPC ............ *G06T 13/20* (2013.01); *G06T 19/006* (2013.01); *H04N 13/106* (2018.05);
(Continued)

(58) Field of Classification Search
CPC ... G06T 19/006; G06T 13/20; H04N 13/0239; H04N 13/0007; H04N 13/0203;
(Continued)

(56) References Cited

U.S. PATENT DOCUMENTS 6,496,598 B1 12/2002 Harman
6,512,892 B1 * 1/2003 Montgomery et al. ....... 396/326
(Continued)

FOREIGN PATENT DOCUMENTS

WO WO 2011123177 A1 * 10/2011

OTHER PUBLICATIONS

Autodesk Stereoscopic Filmmaking Whitepaper: The Business and Technology of Stereoscopic Filmmaking, Autodesk Inc., 2008, pp. 1-7.*
(Continued)

*Primary Examiner* — Zhihan Zhou
(74) *Attorney, Agent, or Firm* — Dentons US LLP (57) ABSTRACT

A computer-implemented method for placing a window object within a computer-generated scene. The computer-generated scene includes a pair of stereoscopic cameras adapted to capture an image of at least one computer-generated object and the window object. A left portion and right portion of the image along the left and right edges of the image are obtained. The nearest computer-generated object to the pair of stereoscopic cameras within the left and right portions of the image is identified. The window object is placed between the identified computer-generated object and the stereoscopic cameras at an offset distance from the identified computer-generated object.

21 Claims, 8 Drawing Sheets

(51) Int. Cl.

| | | |
|---|---|---|
| H04N 13/106 | (2018.01) | |
| H04N 13/128 | (2018.01) | |
| H04N 13/204 | (2018.01) | |
| H04N 13/246 | (2018.01) | |
| H04N 13/275 | (2018.01) | |
| G06T 19/00 | (2011.01) | |
| G11B 27/28 | (2006.01) | |

(52) U.S. Cl.
CPC ......... *H04N 13/128* (2018.05); *H04N 13/204* (2018.05); *H04N 13/246* (2018.05); *H04N 13/275* (2018.05); *G11B 27/28* (2013.01); *H04N 2013/0081* (2013.01)

(58) Field of Classification Search
CPC ....... H04N 2013/0081; H04N 13/0022; H04N 13/0246; H04N 13/0275; G11B 27/28
USPC .......................................................... 348/47
See application file for complete search history.

(56) References Cited

U.S. PATENT DOCUMENTS

| | | | |
|---|---|---|---|
| 6,516,099 | B1 | 2/2003 | Davison et al. |
| 6,798,406 | B1 | 9/2004 | Jones et al. |
| 7,027,659 | B1 | 4/2006 | Thomas |
| 7,512,262 | B2 | 3/2009 | Criminisi et al. |
| 8,228,327 | B2 | 7/2012 | Hendrickson et al. |
| 9,070,222 | B2 | 6/2015 | Mcnally et al. |
| 2002/0122585 | A1 | 9/2002 | Swift et al. |
| 2002/0163482 | A1 | 11/2002 | Sullivan |
| 2003/0020708 | A1 | 1/2003 | Redert |
| 2006/0098896 | A1 | 5/2006 | Pishdadian et al. |
| 2007/0192722 | A1 | 8/2007 | Kokubo |
| 2008/0309660 | A1 | 12/2008 | Bertolami et al. |
| 2010/0039502 | A1 | 2/2010 | Robinson |
| 2011/0169825 | A1 | 7/2011 | Ishiyama et al. |
| 2011/0292045 | A1 | 12/2011 | Nakamura et al. |
| 2011/0304615 | A1 | 12/2011 | Ito et al. |
| 2012/0056984 | A1 | 3/2012 | Zhang et al. |
| 2012/0250152 | A1 | 10/2012 | Larson et al. |
| 2012/0262543 | A1 | 10/2012 | Lee et al. |
| 2012/0314038 | A1 | 12/2012 | Murayama et al. |
| 2012/0320048 | A1 | 12/2012 | Yamashita et al. |
| 2013/0002666 | A1 | 1/2013 | Mihara et al. |
| 2013/0010093 | A1* | 1/2013 | Redmann ........................ 348/61 |
| 2013/0100254 | A1 | 4/2013 | Morioka et al. |
| 2013/0101263 | A1 | 4/2013 | Morioka et al. |
| 2013/0120529 | A1 | 5/2013 | Nio et al. |
| 2013/0128003 | A1 | 5/2013 | Kishida et al. |
| 2013/0128992 | A1 | 5/2013 | Swaminathan et al. |
| 2013/0187910 | A1* | 7/2013 | Raymond et al. ............ 345/419 |
| 2014/0035903 | A1 | 2/2014 | McNally et al. |
| 2014/0035917 | A1 | 2/2014 | McNally et al. |
| 2014/0035918 | A1 | 2/2014 | McNally et al. |
| 2014/0036036 | A1 | 2/2014 | McNally et al. |
| 2014/0036038 | A1 | 2/2014 | McNally et al. |
| 2014/0036039 | A1 | 2/2014 | McNally et al. |

OTHER PUBLICATIONS

1080p—Wikipedia, the free encyclopedia. Accessed Oct. 8, 2010. https://web.archive.org/web/201001008210333/http://en.wikipedia.org/wiki/1080p.*

Ronfard et al. "Image and Geometry Processing for 3-D Cinematography". Book. Geometry and Computing, vol. 5. 2010, pp. 1-305. ISBN: 978-3-642-12391-7 (Print) 978-3-642-12392-4 (Online).*

"Stereoscopic Filmmaking Whitepaper: The Business and Technology of Stereoscopic Filmmaking", Autodesk Inc., 2008, 8 pages.

Notice of Allowance received for U.S. Appl. No. 13/802,706, dated Feb. 23, 2015, 23 pages.

Non-Final Office Action received for U.S. Appl. No. 13/802,714, dated Mar. 11, 2015, 22 pages.

Engle, Rob, "Beowulf 3D: A Case Study", Proc. of SPIE-IS&T Electronic Imaging, SPIE vol. 6803, 2008, pp. 68030R-1-68030R-9.

Fehn, Christoph, "3D-TV Using Depth-Image-Based Rendering (DIBR)", Proc. of Visualization, Imaging and Image Processing, vol. 3, 2003, 6 pages.

Lipton, Lenny, "Digital Stereoscopic Cinema: The 21st Century", Proc. of SPIE-IS&T Electronic Imaging, SPIE vol. 6803, 2008, pp. 68030W-1-68030W-7.

Neuman, Robert, "Bolt 3D: A Case Study", SPIE-IS&T, vol. 7237, 2009, pp. 72370F-1-72370F-10.

Notice of Allowance received for U.S. Appl. No. 13/802,632, dated Jan. 21, 2015, 10 pages.

Non-Final Office Action received for U.S. Appl. No. 13/802,661, dated Jan. 23, 2015, 34 pages.

Notice of Allowance received for U.S. Appl. No. 13/802,692, dated Jan. 5, 2015, 9 pages.

Notice of Allowance received for U.S. Appl. No. 13/845,701, dated Oct. 7, 2014, 10 pages.

Adobe Community Help, "Understanding Stereoscopic 3D in After Effects", retrieved on Feb. 4, 2015, 11 pages. Also available at: <https://helpx.adobe.com/after-effects/kb/stereoscopic-3d-effects.html#main_3D_depth_cues_in_After_Effects_>.

Kim et al., "Depth Adjustment for Stereoscopic Image Using Visual Fatigue Prediction and Depth-Based View Synthesis", IEEE, 2010, pp. 956-961.

Lang et al., "Nonlinear Disparity Mapping for Stereoscopic 3D", ACM Trans. Graph 29, 4, Article 75, Jul. 2010, 10 pages.

Song et al., "A Stereoscopic OpenGL-based Interactive Plug-in Framework for Maya and Beyond", ACM, VRCAI 2009, Dec. 14-15, 2009, pp. 363-368.

Sun et al., "Evaluating Methods for Controlling Depth Perception in Stereoscopic Cinematography", Proceedings of SPIE-IS&T Electronic Imaging, SPIE vol. 7237, 723701, 2009, 12 pages.

Ware et al., "Dynamic Adjustment of Stereo Display Parameters", IEEE Transactions on Systems, Man, and Cybernetics-part A: Systems and Humans, vol. 28, No. 1, Jan. 1998, pp. 56-65.

Zilly et al., "The Stereoscopic Analyzer—An Image-Based Assistance Tool for Stereo Shooting and 3D Production", IEEE, 2010, pp. 4029-4032.

Notice of Allowance received for U.S. Appl. No. 13/802,714, dated May 6, 2016, 8 pages.

Notice of Allowance received for U.S. Appl. No. 13/802,661, dated May 1, 2015, 7 pages.

Advisory Action received for U.S. Appl. No. 13/802,714, dated Apr. 15, 2016, 4 pages.

Final Office Action received for U.S. Appl. No. 13/802,714, dated Dec. 17, 2015, 37 pages.

Non Final Office Action received for U.S. Appl. No. 13/802,714, dated Aug. 26, 2015, 33 pages.

Final Office Action received for U.S. Appl. No. 13/802,716, dated Oct. 21, 2015, 10 Pages.

Non Final Office Action received for U.S. Appl. No. 13/802,716, dated May 6, 2015, 8 pages.

* cited by examiner

TECHNIQUES FOR PLACING MASKING WINDOW OBJECTS IN A COMPUTER-GENERATED SCENE FOR STEREOSCOPIC COMPUTER-ANIMATION

CROSS REFERENCE TO RELATED APPLICATIONS

This application claims the benefit under 35 U.S.C. 119(e) of prior U.S. Provisional Patent Application No. 61/678,568, filed Aug. 1, 2012, which is hereby incorporated by reference in the present disclosure in its entirety.

BACKGROUND

1. Field

The present disclosure relates generally to generating stereoscopic images for computer animation, and more specifically to using window objects to avoid clipping a computer-generated object near the edge of an image.

2. Related Art

Cinematographic-quality computer animation has evolved to produce increasingly realistic and engaging visual effects. One way that this is accomplished is through the use of stereoscopic filming techniques that simulate human binocular vision by presenting slightly different viewpoints of a scene to a viewer's left and right eye. This technique, also known colloquially as "3D," can be used to enhance the illusion of depth perception and make objects in a computer-generated scene appear to extend outward from a two-dimensional screen.

In normal human binocular vision, each eye views the world from a slightly different perspective. The difference in the view from each eye, also called parallax, is caused, in part, by the spatial separation between the eyes. In general, the amount of parallax is increased for objects that are closer to the viewer as compared to objects that are further from the viewer. The brain is able to combine the different views from each eye and use the parallax between views to perceive the relative depth of real-world objects.

Computer-animation stereoscopic filming techniques take advantage of the brain's ability to judge depth through parallax by presenting separate images to each eye. Each image depicts a computer-generated object from a slightly different viewpoint. The distance between the left and right images displayed on a screen (parallax) indicates the relative depth of the displayed computer-generated object. Parallax can be positive or negative depending on whether the computer-generated object appears to be behind the screen (positive parallax) or if it appears to be in front of the screen (negative parallax).

In general, stereoscopic filming techniques use parallax to take advantage of the brain's ability to judge depth based on differences between the visual input from left and right eyes. However, if an object depicted in a stereoscopically filmed scene is clipped by the edge of the image or screen, the viewer may be presented with a visual paradox. As previously explained, an object that is displayed with negative parallax will appear to protrude from the screen plane. However, if a portion of the object falls outside of the display screen area, the object will appear to be hidden or masked behind the edge of the screen, which is behind the protruding object. This effect may be visually distracting, detracts from stereo effect of the displayed image, and is generally undesirable.

What is needed is a technique for preventing or minimizing the effect of this visual paradox in stereoscopically filmed images.

SUMMARY

One exemplary embodiment includes a computer-implemented method for placing a window object within a computer-generated scene. The computer-generated scene includes a pair of stereoscopic cameras adapted to capture an image of at least one computer-generated object and the window object. A left portion and right portion of the image along the left and right edges of the image are obtained. The nearest computer-generated object to the pair of stereoscopic cameras within the left and right portions of the image is identified. The window object is placed between the identified computer-generated object and the stereoscopic cameras at an offset distance from the identified computer-generated object. The location of the window object is stored in computer memory.

In some embodiments, a stereoscopic image of the computer-generated scene is created using the pair of stereoscopic cameras, wherein a portion of the computer-generated object is hidden behind the stereo window; and storing, in the computer memory, the stereoscopic image. In some cases, the window object separated from the computer-generated object by an offset that is less than a width of the computer-generated object. In some cases, the left and right portions of the image are 48 pixels wide. In some cases, the left and right portions of the image are 60 percent of height of the image.

In a typical embodiment, the window object comprises two vertical bar-shaped surfaces. The vertical bar-shaped surfaces are depicted, respectively near a left and right edge portion of a stereoscopic image produced using the pair of stereoscopic cameras.

In another exemplary embodiment, a timeline for a film sequence is obtained. The timeline comprises a plurality of time entries. For each of at least two time entries of the plurality of time entries, a left portion and right portion of the image are obtained along the left and right edges of the image. The nearest computer-generated object to the pair of stereoscopic cameras within the left and right portions of the image is identified. The window object is placed between the identified computer-generated object and the stereoscopic cameras at an offset distance from the identified computer-generated object. The location of the window object is stored in computer memory.

In another exemplary embodiment, a timeline for a film sequence is obtained. The timeline comprises a plurality of time entries. A window object location distribution is obtained, wherein the window object location distribution comprises one window object location for at least two time entries of the plurality of time entries. A statistical measurement of the window object location distribution is calculated. If the statistical measurement is less than a threshold value, then a static window object location is calculated based on a statistical mean of the window object location distribution. The static window object location is stored in computer memory as the window object location for each of the at least two time entries. If the statistical measurement is greater than or equal to a threshold value, a set of smoothed window object locations is calculated based on the window object location distribution and a smoothing function. The set of smoothed window object locations are stored in computer memory as the window object locations for each of the at least two time entries. In some cases, the smoothing function is a low-pass filter.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Figure 1:
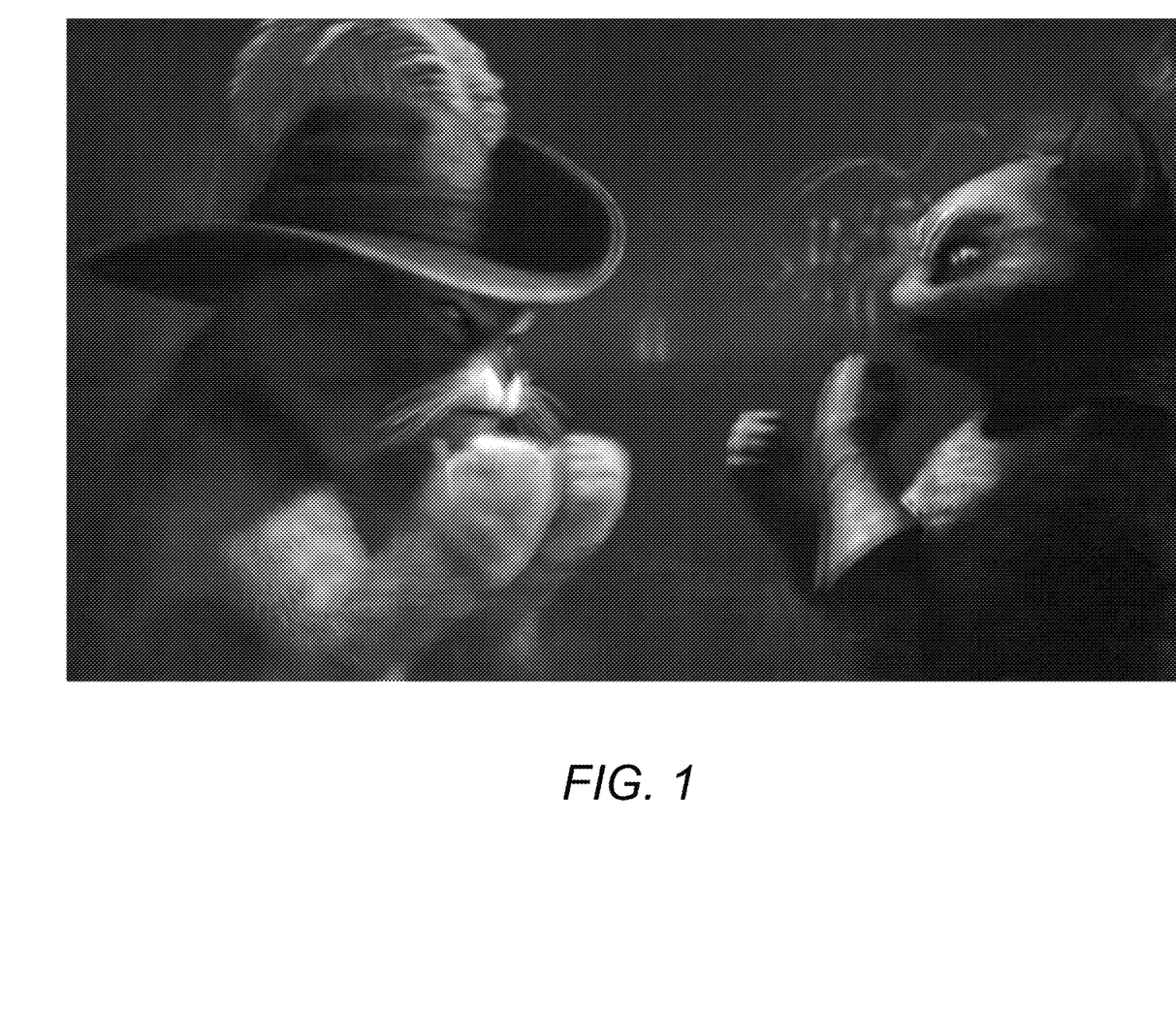
FIG. 1 depicts a stereoscopically filmed, computer-generated scene.

FIG. 1 depicts a stereoscopically filmed, computer-generated scene. The scene depicts two animated characters viewed in profile. For purposes of this discussion, each animated character is treated as a single computer-generated object. The image depicted in FIG. 1 is a composite of two views of the computer-generated scene: one view from a left camera and one view from a right camera. The left and right camera views can be used to produce a stereoscopic image of the computer-generated scene. In a typical case, the cameras used to produce the left and right views are offset a distance that corresponds to an estimated distance between the viewer's eyes (approximately 65 mm).

The image in FIG. 1 appears slightly blurred because the animated characters (exemplary computer-generated objects) are viewed from the slightly different positions of the left and right camera. However, when the image is viewed with appropriate stereoscopic equipment, the left-camera view is presented to the viewer's left eye in isolation and the right-camera view is presented to the viewer's right eye in isolation. This can be achieved using a number of techniques that are known in the art, including, for example, use of stereoscopic glasses. Using these known techniques, the left-camera view is separately presented to the left eye using polarized or color-coded light that corresponds to a polarized or color-coded left lens of the stereoscopic glasses. Similarly, the right-camera view is separately presented to the right eye using polarized or color-coded light that is distinguishable from the left-camera view.

The viewer is able to mentally and visually combine the left-camera and right-camera view into a composite image that includes a certain degree of parallax for one or more computer-generated objects. The greater the parallax, the closer/farther the computer-generated object appears to the viewer (with respect to the display screen). As discussed above, a filmmaker can use this stereo effect to make computer-generated objects appear to have depth even though they are displayed on what is essentially a two-dimensional display screen.

To create a stereoscopic film sequence, the computer-generated scene can be animated using traditional computer-animation techniques and the scene can be stereoscopically filmed. The resulting stereoscopic film sequence comprises a series of image frames, each image frame representing the computer-generated scene at a point in time. When the series of image frames are presented to a viewer, the computer-generated scene can be made to depict a live action scene appearing to have depth due to the stereoscopic effect of the filming technique.

1. Filming and Viewing a Stereoscopic Computer-Generated Scene

Figure 2A:
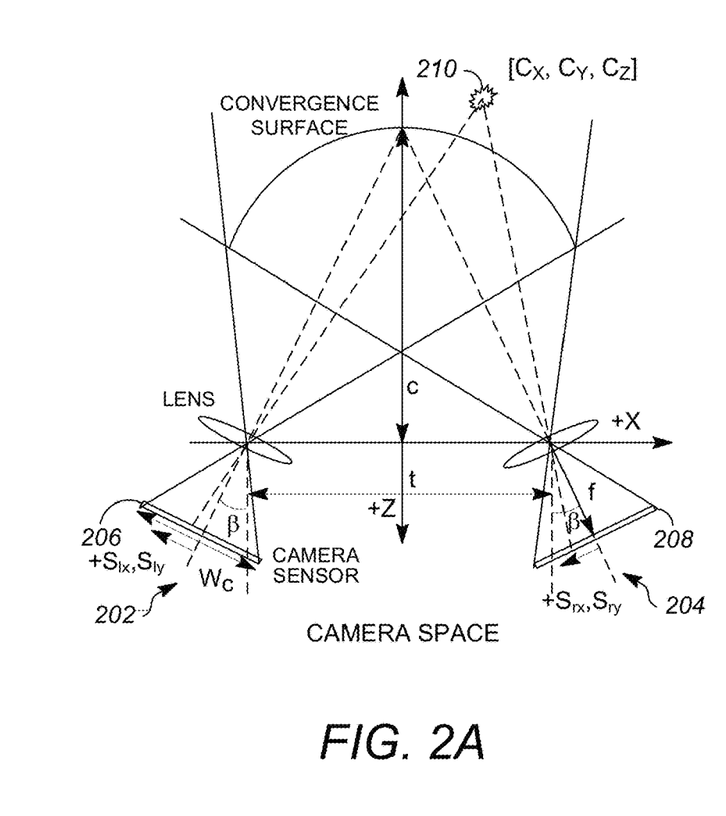
FIGS. 2A and 2B depict exemplary configurations for stereoscopically filming a computer-generated scene.
Figure 2B:
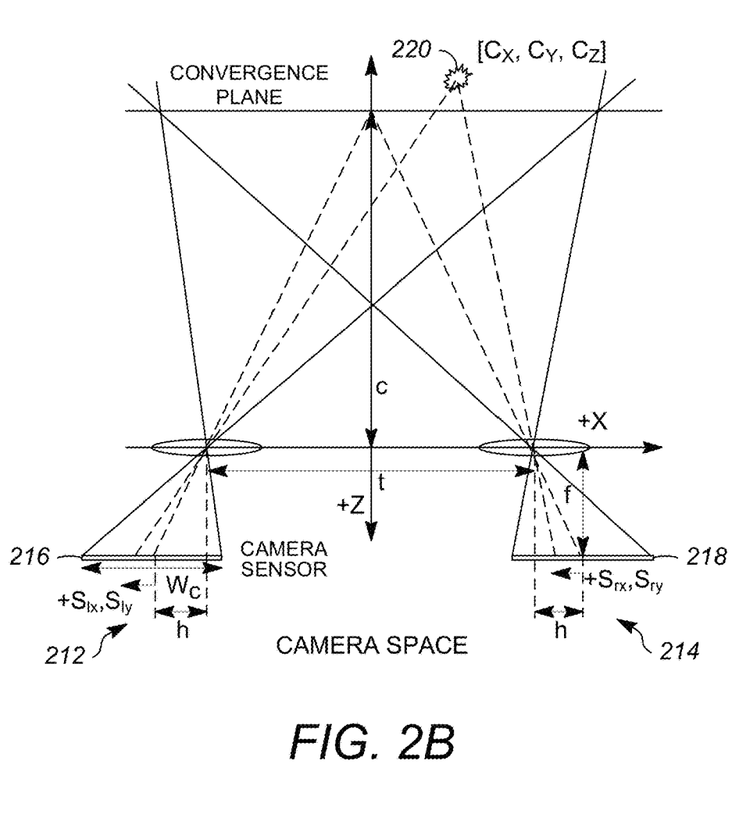

FIGS. 2A and 2B depict exemplary optical configurations of a stereoscopically filmed computer-generated scene in camera space. The configurations include a left camera (202, 212) and a right camera (204, 214) that are capable of viewing a point (210, 220) on an object in a computer-generated scene. FIGS. 2A and 2B depict alternative configurations for positioning the cameras when filming the computer-generated scene. FIG. 2A depicts a converged camera configuration with the cameras 202 and 204 pointed inward at an angle β and converging along a curved convergence surface. FIG. 2B depicts an alternative configuration with cameras 212 and 214 pointed in a parallel direction and having sensors (216, 218) offset from the center of their respective lens at a distance h. In FIG. 2B, the parallel cameras 212 and 214 converge along a convergence plane. Either of the camera configurations shown in FIG. 2A or 2B can be used to stereoscopically film a computer-generated scene.

With reference to FIG. 2A, the left and right cameras (202, 204) each record a different image of the computer generated scene, which includes point 210. The left camera 202 records an image of the point 210 at left-image location ($S_{lx}$, $S_{ly}$) using the left camera sensor 206. Similarly, the right camera 202 records an image of the point 210 at right-image location ($S_{rx}$, $S_{ry}$) using the right camera sensor 208. The difference between the left-image location ($S_{lx}$, $S_{ly}$) and the right-image location ($S_{rx}$, $S_{ry}$) indicates the amount of parallax for point 210. Similarly, with reference to FIG. 2B, the left and right cameras (212, 214) each record a different image of the point 220 at left-image location ($S_{lx}$, $S_{ly}$) for left sensor 216 and the right-image location ($S_{rx}$, $S_{ry}$) for right sensor 218.

FIGS. 2A and 2B also depict several scene parameters that have an impact on how computer-generated objects or points in the computer-generated scene will be perceived by the viewer. The three-dimensional scene coordinate ($C_x$, $C_y$, $C_z$) describes the location of the point 210 within the computer-generated scene. Convergence distance c is the distance from the lenses and the convergence surface or convergence plane. The convergence surface/plane corresponds to the location of points that will have zero parallax between the left and right images. Also, points located further away from the convergence surface/plane will have greater parallax than those points that are closer to the convergence surface/plane. The camera separation t represents the distance between optical nodes of the left and right cameras, and may also have an impact on the amount of parallax. The left and right cameras also have sensor width $W_c$ and a focal length f from the sensor to the lens.

Figure 2C:
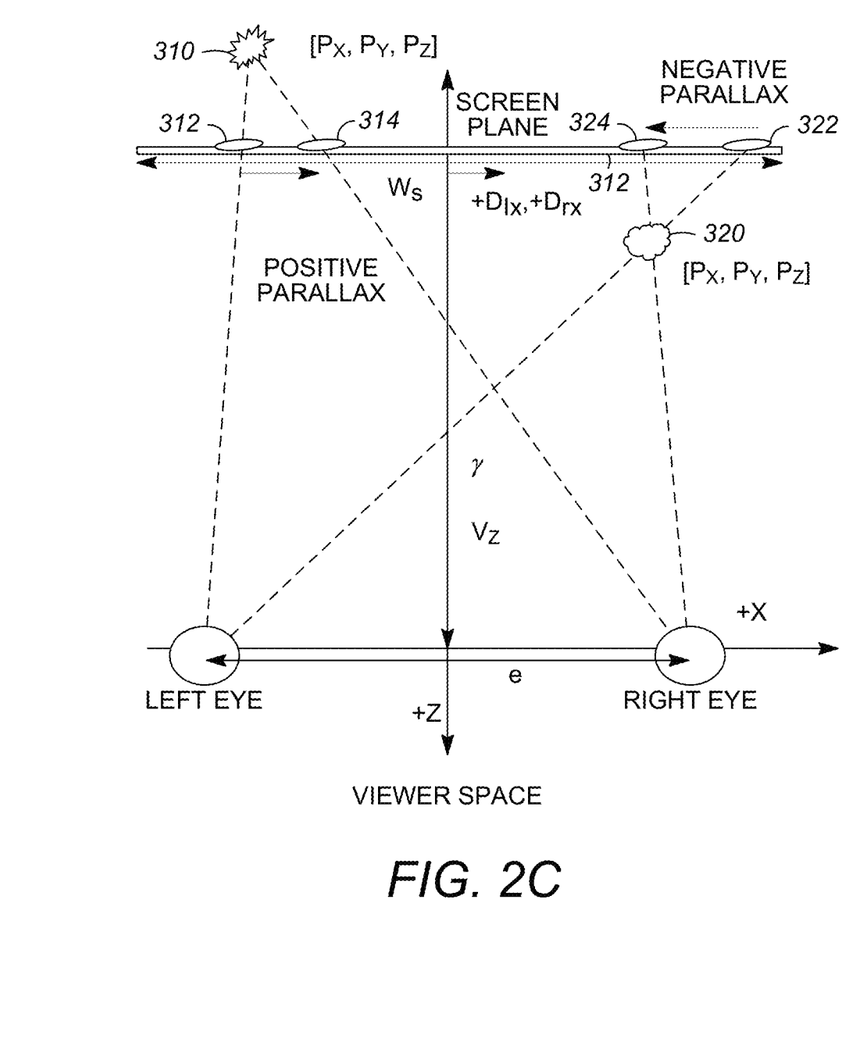
FIG. 2C depicts an exemplary configuration for displaying a stereoscopically filmed scene.

FIG. 2C depicts an exemplary configuration of a stereoscopically filmed computer-generated scene in viewer space. In general, viewer space represents how a stereoscopically filmed, computer-generated scene may be perceived by a modeled viewer located a specified distance from a modeled screen. As shown in FIG. 2C, the modeled viewer has an inter-ocular distance e and is positioned a distance $V_z$ from the modeled screen having a screen width $W_s$. FIG. 2C depicts how left and right views, each presented to the modeled viewer's left and right eye respectively, result in eye convergence that simulates the points as being out of plane from the screen. Specifically, FIG. 2C depicts perceived point 310 that appears to be behind the screen plane, and perceived point 320 that appears to be in front of the screen plane.

Perceived point 310 is represented by left-camera image 312 and right-camera image 314. Because the left-camera image 312 is to the left of right-camera image 314, the perceived point 310 is said to have positive parallax and will appear to the viewer to have a depth that is greater than the distance from the viewer to the screen $V_z$. In other words, to the viewer, the perceived point 310 will appear to exist behind the screen plane.

Similarly, perceived point 320 is represented by left-camera image 322 and right-camera image 324. Because the left-camera image 322 is to the right of right-camera image 324, the perceived point 320 is said to have negative parallax and will appear to the viewer to have a depth that is less than the distance from the viewer to the screen $V_z$. In other words, to the viewer, the perceived point 320 will appear to exist in front of the screen plane.

One technique for simplifying the stereo configuration is to describe a set of bounded-parallax constraints. A set of bounded-parallax constraints typically includes a far-parallax value, a near-parallax value, a near distance, a far distance, and a focal length. The far-parallax value is the maximum positive parallax for the computer-generated scene and is typically expressed in terms of pixels or a percentage of screen width. Similarly, the near-parallax value is the minimum negative parallax for the computer-generated scene and is also typically expressed in terms of pixels or a percentage of screen width. The near distance and far distance are the near and far limits of where computer-generated objects may be placed within the computer-generated scene. Focal length is the focal length of the pair of stereoscopic cameras and is depicted as f in FIGS. 2A and 2B, above.

The amount of stereo effect perceived by the viewer can be controlled by manipulating the bounded-parallax constraints or the other scene parameters discussed above with respect to FIGS. 2A and 2B. Ideally, the scene parameters (e.g., the bounded-parallax constraints) are set to produce an optimum stereo effect for at least one of the computer-generated objects in the scene. However, because the composition of a computer-generated scene can vary and the desired amount of stereo effect may vary, the scene parameters and the optimal parameter settings may also vary over the course of computer-animated film sequence. As previously mentioned, one solution is to manually adjust the scene parameters to suit the requirements for each scene. However, this approach typically requires the direct involvement of a skilled director or stereographer to ensure that the settings are appropriate. Even then, it may be difficult to maintain consistency across scenes in a film or across films produced from the same studio.

Therefore, it is generally desirable to automate at least a portion of the scene parameter setting process while still providing the filmmaker with creative control, when necessary. The system and techniques discussed below can be used to determine optimal scene parameter settings and position the stereoscopic cameras within the scene to obtain an optimized and consistent stereo effect.

2. Automated Process for Placing Window Objects in a Computer-Generated Scene

As described above, stereoscopic filming techniques take advantage of the brain's ability to judge depth through parallax by presenting separate images to each eye. Positive or negative parallax in the displayed image may give the viewer the impression that a depicted object is behind or in front of the display screen. The greater the negative (or positive) parallax, the closer (or farther) a displayed object will appear to the viewer.

If, however, the object is clipped by the edge of the image, the viewer may be presented with a visual paradox. As previously explained, an object that is displayed with negative parallax will appear to protrude from the screen plane. However, if a portion of the object falls outside of the display screen area, the object will appear to be hidden or masked behind the edge of the screen, which is behind the protruding object. This effect may be visually distracting, detracts from stereo effect of the displayed image, and is generally undesirable.

Figure 4:
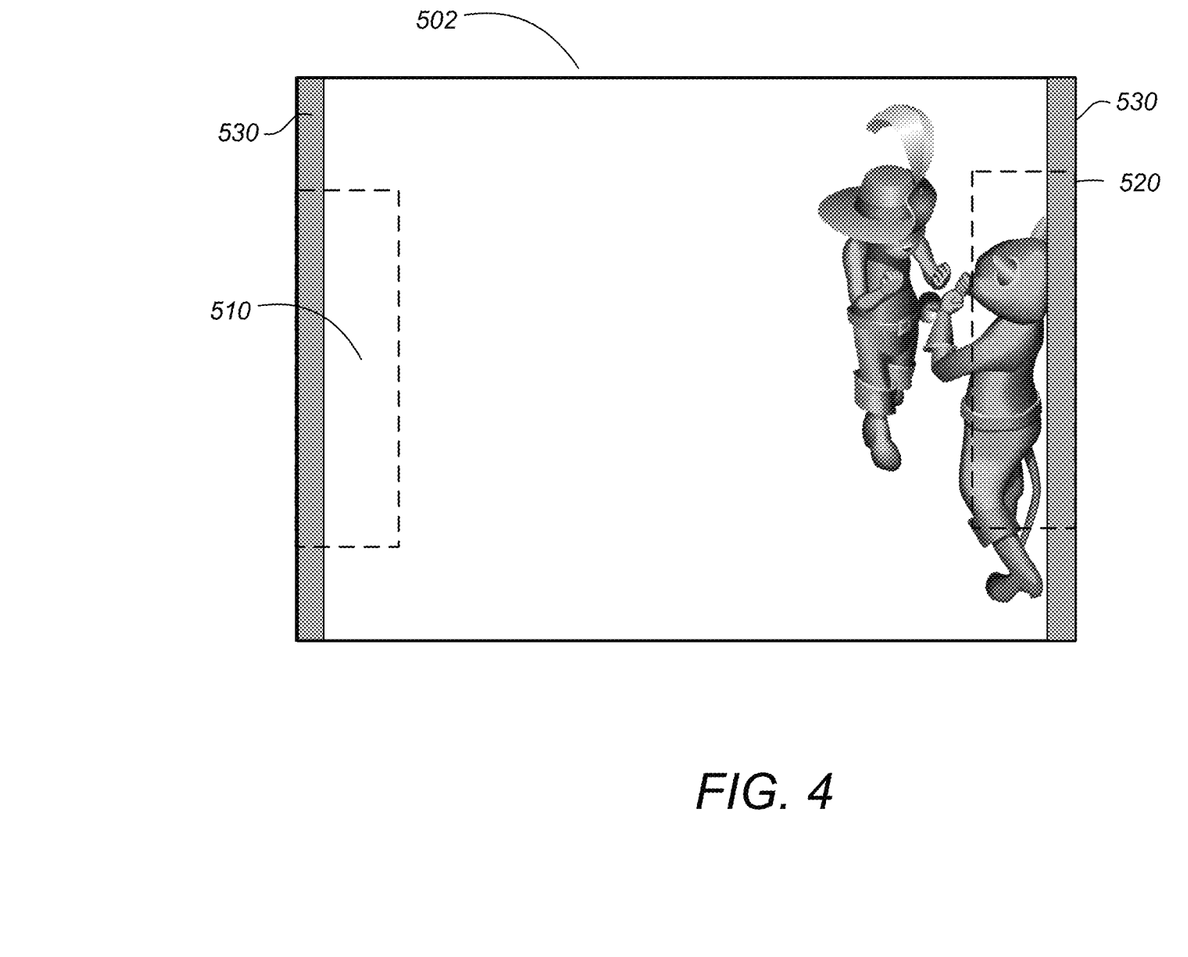
FIG. 4 depicts an exemplary image and left and right portions for placing a window object.

One solution is to this potential clipping problem is to create and display a window object that is opaque and frames the displayed portion of the computer-generated scene. FIG. 4 depicts a computer-generated scene with window object 530. The window object is typically an opaque, bar-shaped surface that is substantially aligned with the left and right edges of an image 502 of the computer-generated scene. Typically, the width of the window objects is less than 10 percent of the screen width. The window object is typically located within the computer scene between the displayed objects and the pair of stereoscopic cameras. When the computer-generated scene is stereoscopically filmed, the displayed objects will appear to be masked or clipped by the opaque window object, instead of the edge of the image. In this way, the above-mentioned paradox caused by edge clipping can be avoided.

Figure 3:
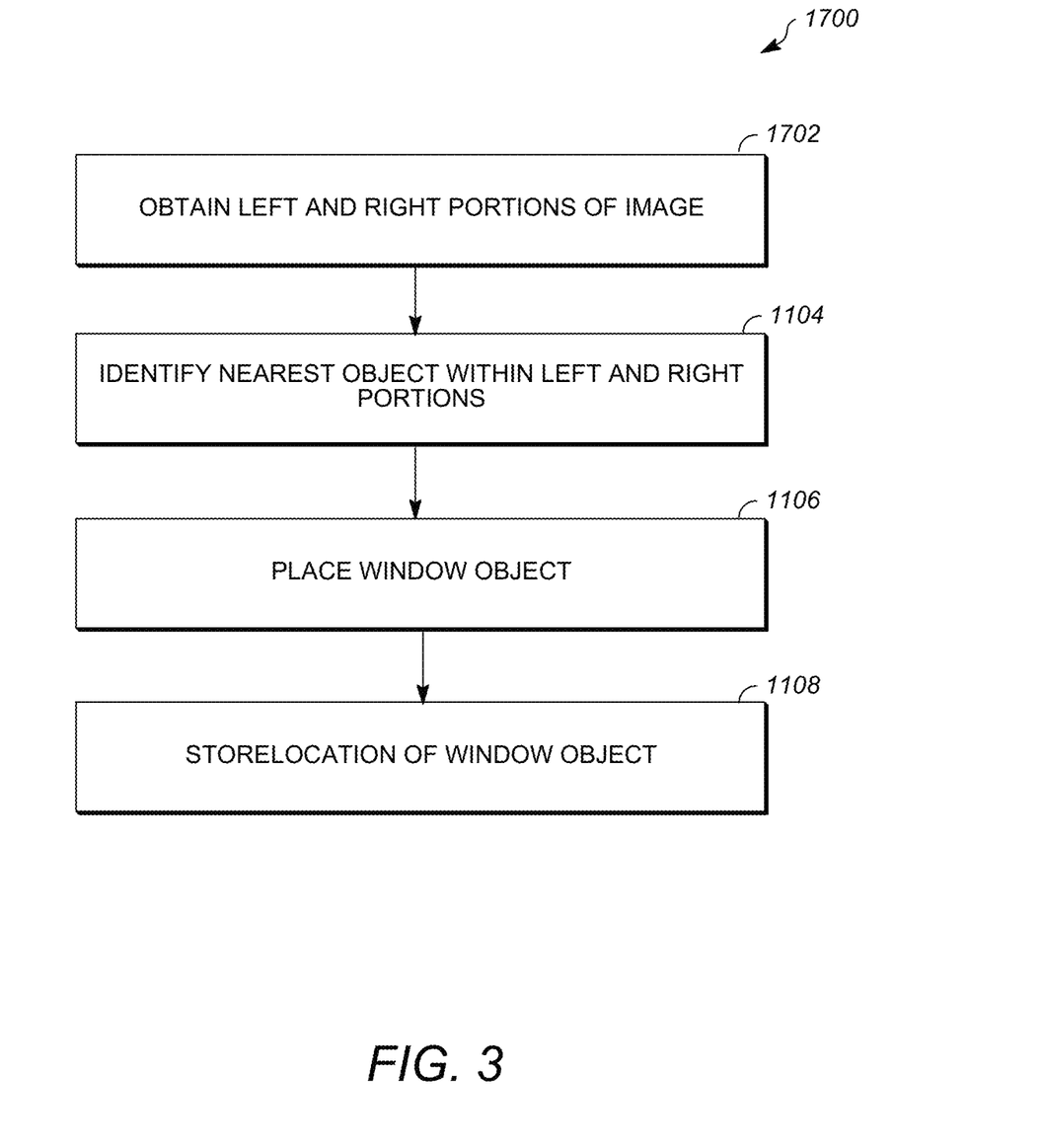
FIG. 3 depicts an exemplary process for automating the placement of a window object in a computer-animated scene.

To create the appropriate effect, window objects must be placed within the scene in a location that masks the clipped objects as they are animated in the computer-generated scene. FIG. 3 depicts an exemplary process 1700 for the placement of window object in a computer-generated scene.

In operation 1702, left and right regions are obtained that correspond to left and right portions of an image captured by the stereoscopic camera sensor. In the present embodiment, the left region is defined as an area aligned with the left by the left edge of the image, having a specified width and specified height that is less than the width and height of the image. Similarly, the right region is defined as an area alighted with the right edge of the image and having the same width and height. For a camera sensor having a horizontal resolution of 1920 pixels, the width is approximately 48 pixels and the height is approximately 60 percent of the image height. In other embodiments, the width and height may be different values and may depend, in part, on the resolution and size of the camera sensor. FIG. 4 depicts an exemplary image 502 and corresponding left portion 510 and right portion 520.

In operation 1704, the computer-generated object nearest to the pair of stereoscopic cameras within the left and right portions is identified. For this operation, computer-generated objects having a positive parallax value are ignored in this operation because they will appear behind the display screen and will be properly clipped by the edge of the image.

In operation 1704, a projected area associated with the left and right portions of the image is scanned or sampled for a computer-generated object that is nearest to the pair of cameras. As discussed with respect to operation 1102 for process 1100, a scan can be performed over a projected area to identify the nearest object. In some cases, the results from the scan performed in operation 1102 can be re-used to perform operation 1702.

In operation 1706, the window object is placed in the computer-generated scene at a location that is offset from the computer-generated object identified in operation 1704. In this embodiment, the window object is placed by adding 3 distance unit offset to the position of the identified computer-generated object. The offset is typically less than the width of the computer-generated object being masked. This ensures that the window object will be located between the identified computer-generated object and the pair of stereoscopic cameras. If the window object is placed too far from the identified computer-generated object, the window object may be more obvious to the viewer and/or may not perform the necessary masking. FIG. 4 depicts an exemplary window object 530 as captured by image 502.

In operation 1708, the location of the window object is stored for the computer-generated scene. The location of the window object may be stored, for example, on a non-transitory computer-readable storage medium, such as a computer storage disk. Other computer storage examples are provided below and discussed with respect to FIG. 7.

During an animation sequence, the location of the computer-generated objects (e.g., animated characters) will typically change over time within the computer-generated scene. It is generally desirable to ensure that the location of the window object also changes over time in accordance with the location of the computer-generated objects. Therefore, it is generally desirable to determine the location of the window object for multiple frames in the film sequence timeline to avoid the above-mentioned clipping problem. Thus, in a typical implementation, process 1700 is repeated for multiple time entries for a film-sequence timeline.

Figure 5:
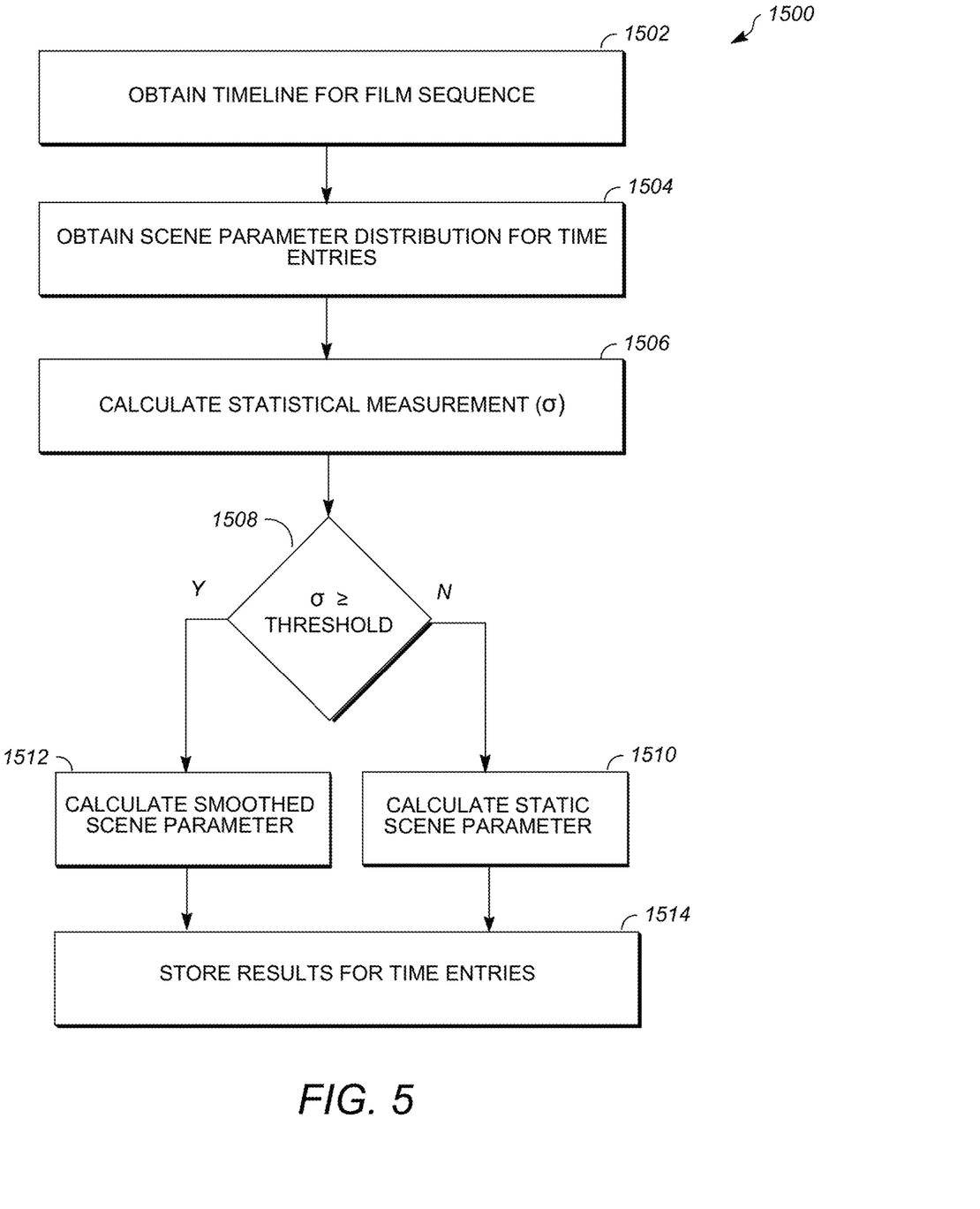
FIG. 5 depicts an exemplary process for filtering a set of scene parameters for a sequence of images in a film sequence.

In some cases, a window object location curve can be constructed similar to the stereo curves discussed below with respect to process 1500. In some cases, the window location curve can be smoothed using process 1500. In particular, process 1500 can be implemented using a window object location curve (similar to the raw stereo curve provided in the exemplary process 1500). Using process 1700 and 1500 together in this way, a more consistent and visually satisfactory stereoscopic film sequence may be produced.

3. Smoothing a Scene Parameter Distribution for a Film Sequence

A computer-animated film sequence can be created by animating a computer-generated scene and stereoscopically filming the animated scene using a pair of stereoscopic cameras. The resulting stereoscopic film sequence comprises a series of image frames, each image frame representing the computer-generated scene along a film-sequence timeline.

Each image frame is also associated with a group of scene parameters that define, inter alia, the position of the pair of stereoscopic cameras within the scene, and therefore the amount of stereo effect. As previously discussed, the scene parameters may include camera separation, convergence distance, near-parallax, far-parallax, and the like. Other scene parameters may include the size and location of a window object used to mask objects that are clipped by the edge of the image, as discussed above with respect to process 1700. Typically, the scene parameters change over time due to changes in the composition of the scene, movement of the pair of cameras, or both.

Figure 6:
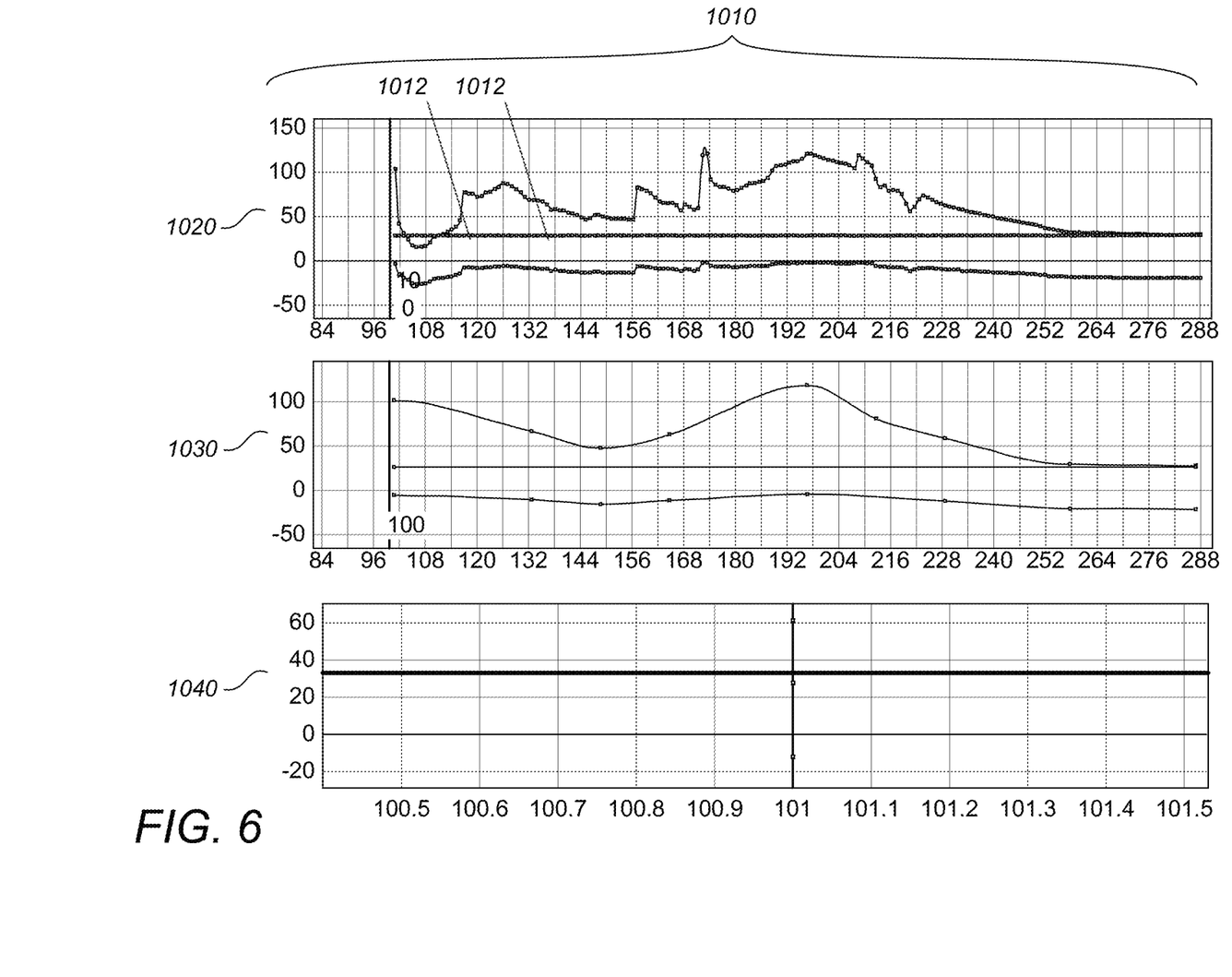
FIG. 6 depicts exemplary stereo curves for a film sequence.

FIG. 6 depicts a raw stereo curve 1020 including the values of three scene parameters (minimum scene depth, far-parallax, and near-parallax) over a film-sequence timeline 1010. The film-sequence timeline includes a plurality of time entries 1012. Each time entry 1012 represents a moment in time and is associated with corresponding image frame in the film sequence and a group of scene parameters.

As shown in FIG. 6, the scene parameters vary for each time entry 1012 across the film-sequence timeline 1010. Raw stereo curve 1020 in FIG. 6 represents the raw scene parameters over the film-sequence timeline 1010. Raw stereo curve 1020 includes sharp rises or dramatic changes in the scene parameters, which may result in stereo effect that appears wobbly or jittery for the corresponding film sequence. This effect may be distracting and detract from the realism in the computer-animated scene. To improve the stereo effect for a film sequence, it may be desirable to smooth the values of the scene parameters over a film-sequence timeline 1010.

FIG. 5 depicts and exemplary process 1500 for smoothing a scene parameter for a computer-animated film sequence. The computer-animated film sequence is typically defined with respect to a continuous sequence of image frames depicting a computer-generated scene. Process 1500 is described with respect to an exemplary stereo parameter, near-parallax. However, other scene parameters could also be used and the process is typically repeated for more than one of the bounded-parallax constraints (e.g., minimum scene depth, maximum-scene depth, and far-parallax). Additionally, process 1500 can be applied to different scene parameters, including the size and location of a window object as described above with respect to process 1700.

In general, process 1500 can be used to determine if the variation in the scene parameters for a film sequence is small enough that a constant scene parameter can be used for the entire film sequence. If the variation is too large, process 1500 can be used to apply a smoothing function to the scene parameters to reduce the impact of drastic changes in scene parameter values.

In operation 1502, a film-sequence timeline is obtained for the film sequence. The film-sequence timeline includes a plurality of time entries that are associated with a plurality of image frames in the film sequence. As discussed above, the time entries typically represent $\frac{1}{24}$ second timing intervals along the film-sequence timeline, although other time intervals may be used and it is not necessary that the time intervals be regularly spaced along the film-sequence timeline.

In process 1504, a scene parameter distribution is obtained for at least two time entries of the plurality of time entries. In this example, the scene parameter distribution includes a near-parallax value for each of the at least two time entries. The near-parallax values can be obtained from the raw stereo curve 1020 depicted in FIG. 6. These values may be obtained from computer memory or they may be obtained as an output of another process. In other embodiments, the size and location of a window object can be obtained in process 1504. As discussed above, process 1700 can be used to obtain a size and location of a window object for an image frame of the film sequence.

In operation 1506, a statistical measurement is calculated for the scene parameter distribution. In this example, a standard deviation is calculated for the distribution. There are various techniques for calculating a standard deviation of a distribution of numbers. Equation 1, below, depicts one exemplary technique for calculating the standard deviation a for the distribution of far-parallax values fs:

$$\sigma = \sqrt{\frac{\sum_{i=1}^{n} ns_i^2}{n-1} - \frac{n}{n-1}\left(\frac{\sum_{i=1}^{n} ns_i}{n}\right)^2}, \tag{1}$$

where n is the number of time entries, and $ns_i$ is the near-parallax value (or other scene parameter being smoothed) for the $i^{th}$ time entry. Generally, the standard deviation a represents how much variation exists with respect to an average or mean of the scene parameter distribution. A low standard deviation indicates that the scene parameter values tend to be very close to the mean, whereas high standard deviation indicates that the scene parameter values are spread over a larger range of values.

In operation 1508, the standard deviation is compared to a threshold value. In this example, the scene parameter is the near-parallax value and the threshold is measured in terms of a distance relative to the size of the camera sensor or the display screen and expressed in terms of a number of (screen or sensor) pixels. The threshold is used to determine if the variation in the near-parallax values is small enough that a constant near-parallax value can be used for the entire film sequence. In some cases, a threshold value of 4.25 pixels is an appropriate cutoff. In other cases, a threshold value of 4.25 pixels or greater can be used. In some cases, a threshold value of 4.25 pixels or less can be used. The threshold value, if measured in pixels, is relative to the resolution of the camera and/or screen and may vary as the resolution of the camera and/or screen varies. The threshold value will typically be expressed in terms of the same units or relative measure as the scene parameter. Therefore, if a different scene parameter is used, a different threshold will be used.

In operation 1510, a static scene parameter is calculated if the standard deviation a is less than the threshold value. In this example, an average value is calculated as the static scene parameter based on the scene parameter distribution. The average scene parameter may be computed as the arithmetic mean and expressed as:

$$ns_{ave} = \frac{1}{n}\sum_{i=1}^{n} ns_i \tag{2}$$

where $ns_{ave}$ is the average near-parallax, n is the number of time entries, and $ns_i$ is the near-parallax value for the $i^{th}$ time entry. Equation 16 represents an exemplary calculation and other techniques can be used to calculate an average scene parameter. In other embodiments, a statistical mean value may be calculated and used as the static scene parameter. Static stereo curve 1040 shown in FIG. 6 depicts an exemplary static near-parallax value over time.

In operation 1512, a set of smoothed scene parameters is calculated based on a smoothing function if the standard deviation a is greater than or equal to the threshold value. In this example, the smoothing function is low-pass filter function that is applied to the scene parameter distribution to obtain a set of smoothed parameters. The example provided in equations 3, 4, and 5 below, demonstrates how a smoothed stereo curve is calculated by averaging each near-parallax value $ns_i$ by the two closest neighboring points on either side of $ns_i$. Equation 17 depicts an exemplary mean filter:

$$ns_{filter} = [1/5, 1/5, 1/5, 1/5, 1/5]. \tag{3}$$

Equation 18 depicts the convolution of $ns_{filter}$ with a raw stereo curve ns:

$$ns_{smoothed} = ns_{filter} * ns. \tag{4}$$

Equation 19 depicts an exemplary computation of the an individual smoothed value $ns_i$, as an explicit implementation of the convolution of equation 18:

$$ns_{i\ smoothed} = \frac{ns_{i-2} + ns_{i-1} + ns_i + ns_{i+1} + ns_{i+2}}{5}. \tag{5}$$

Equations 3, 4, and 5 depict an exemplary technique for calculating a set of smoothed parameters. Other techniques using other types of filtering and/or smoothing functions could also be used. For example, in some cases, hysteretic, anticipatory, and reactionary filtering techniques could also be used.

FIG. 6 depicts an exemplary smoothed stereo curve 1030 that may result from operation 1512. As compared to the raw stereo curve 1020, the smoothed stereo curve 1030 does not exhibit sharp changes in the stereo settings across the film-sequence timeline 1010.

In operation 1514, the results are stored in computer memory. If the threshold test of operation 1508 is not met, the static scene parameter value is stored as the scene parameter value for each of the at least two time entries. If the threshold test of operation 1508 is met, the set of smoothed scene parameter values are stored as the scene parameter value for each of the at least two time entries.

As previously mentioned, other scene parameters can also be computed based on the result of process 1500. For example, as described above with respect to process 1700, the size and location of a window object can be computed for a stereoscopic image. Process 1700 can be repeated for multiple images in a film sequence. Using process 1500, described above, the size and/or location of the window object can be smoothed over a film sequence to reduce jumpy or wobbly effects than may be an artifact of the computational process described in process 1700 above.

4. Implementation on a Computer Hardware Platform

Figure 7:
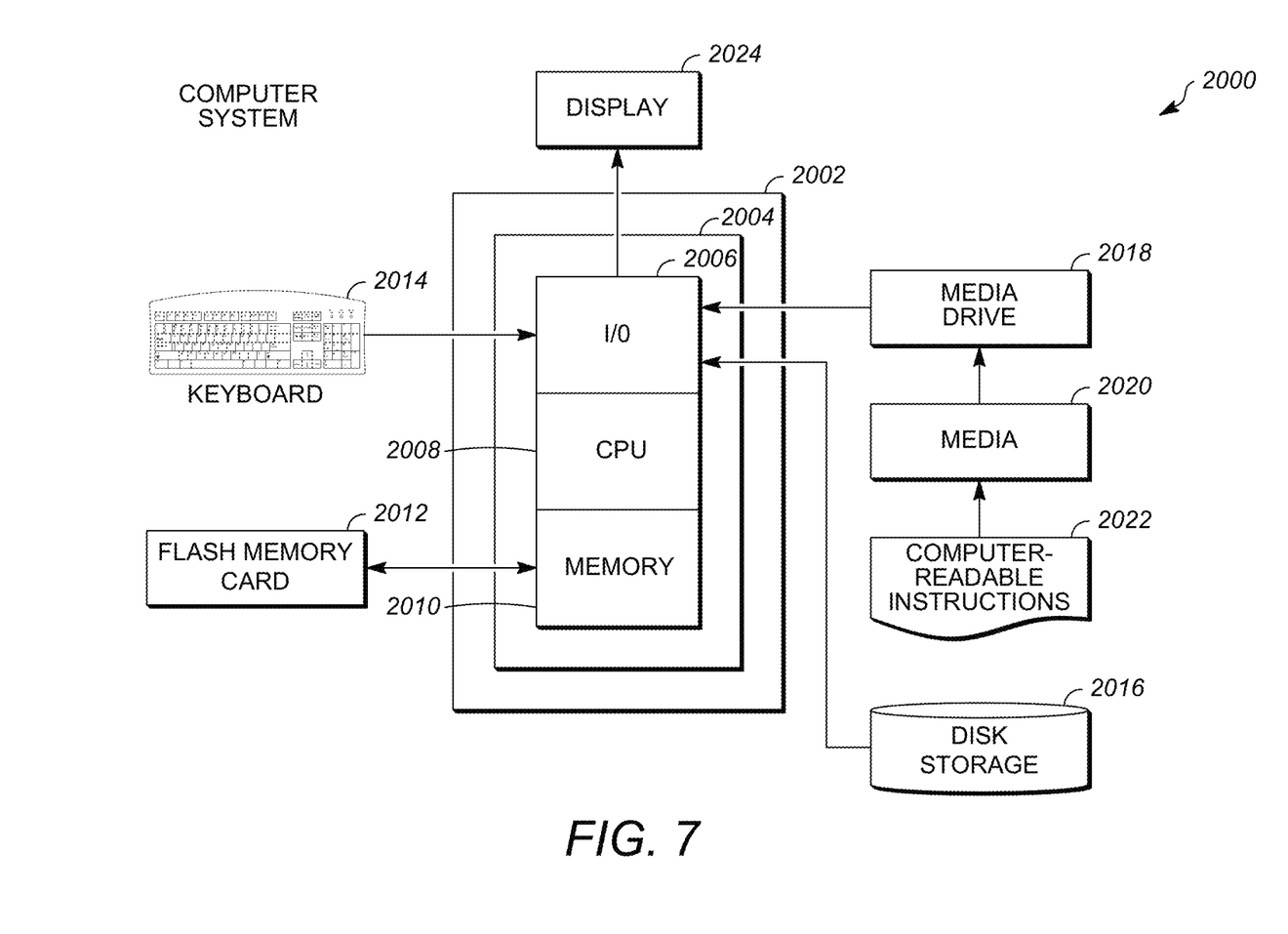
FIG. 7 depicts an exemplary computer system.

The embodiments described herein are typically implemented in the form of computer software (computer-executable instructions) executed on a computer. FIG. 7 depicts an exemplary computer system 2000 configured to perform any one of the above-described processes. In this context, computer system 2000 may be a general-purpose computer including, for example, a processor, memory, storage, and input/output devices (e.g., monitor, keyboard, disk drive, Internet connection, etc.). However, computer system 2000 may include circuitry or other specialized hardware for carrying out some or all aspects of the processes. In some operational settings, computer system 2000 may be configured as a system that includes one or more units, each of which is configured to carry out some aspects of the processes either in software, in hardware, or in some combination thereof. For example, in some embodiments, the process for computing the bounded-parallax constraints in accordance with the processes described above may be computed on parallel computer processors or performed on separate computer systems.

FIG. 7 depicts a computer system 2000 with a number of standard components that may be used to perform the above-described processes. The main system 2002 includes a motherboard 2004 having an input/output ("I/O") section 2006, one or more central processing units ("CPU") 2008, and a memory section 2010, which may have a flash memory card 2012 related to it. The I/O section 2006 is connected to a display 2024, a keyboard 2014, a disk storage unit 2016, and a media drive unit 2018. The media drive unit 2018 can read a computer-readable medium 2020, which typically contains computer-readable instructions 2022 and data.

At least some values based on the results of the above-described processes can be saved for subsequent use. For example, the outputs of the system, including the bounded-parallax constraints, can be saved directly in memory 2010 (e.g, RAM (Random Access Memory)) or another form of storage, such as disk storage 2016. Additionally, values derived from the bounded-parallax constraints, such as camera positions or images of the computer-generated scene, can also be saved directly in memory.

The above-described processes may be used to define the bounded-parallax constraints for a computer-generated scene. By computing the bounded-parallax constraints, a user can compose and stereoscopically film a computer-generated scene to produce a stereoscopic image that does not require excessive convergence or divergence of the viewer's eyes. This stereoscopic image may be visualized as a still image or as part of a film sequence. The stereoscopic image may be stored in memory 2010 or disk storage 2016, or viewed on a computer display 2024.

Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although the invention has been described in considerable detail with reference to certain embodiments thereof, other embodiments are possible, as will be understood to those skilled in the art.

What is claimed is:

1. A computer-implemented method for placing a window object within a computer-generated scene, the computer-generated scene including a pair of stereoscopic cameras adapted to capture an image of at least one computer-generated object and the window object, the method comprising:
   obtaining a left portion and right portion of the image along the left and right edges of the image;
   identifying the nearest computer-generated object to the pair of stereoscopic cameras within the left and right portions of the image;
   placing the window object between the identified computer-generated object and the stereoscopic cameras at an offset distance from the identified computer-generated object; and
   storing, in a computer memory, the location of the window object.

2. The computer-implemented method of claim 1, further comprising,
   creating a stereoscopic image of the computer-generated scene using the pair of stereoscopic cameras, wherein a portion of the computer-generated object is hidden behind the stereo window; and
   storing, in the computer memory, the stereoscopic image.

3. The computer-implemented method of claim 1, wherein the window object separated from the computer-generated object by an offset that is less than a width of the computer-generated object.

4. The computer-implemented method of claim 1, wherein the left and right portions of the image are 48 pixels wide.

5. The computer-implemented method of claim 1, wherein the left and right portions of the image are 60 percent of height of the image.

6. The computer-implemented method of claim 1, wherein the window object comprises two vertical bar-shaped surfaces, and wherein the vertical bar-shaped surfaces are depicted, respectively, near a left and right portion of a stereoscopic image produced using the pair of stereoscopic cameras.

7. A computer-implemented method for placing a window object within a computer-generated scene, the computer-generated scene including a pair of stereoscopic cameras adapted to capture an image of at least one computer-generated object and the window object, the method comprising:
   obtaining a timeline for a film sequence, the timeline comprising a plurality of time entries;
   for each of at least two time entries of the plurality of time entries:
      obtaining a left portion and right portion of the image along the left and right edges of the image;
      identifying the nearest computer-generated object to the pair of stereoscopic cameras within the left and right portions of the image;
      placing the window object between the identified computer-generated object and the stereoscopic cameras at an offset distance from the identified computer-generated object; and
      storing, in a computer memory, the location of the window object.

8. A computer system for placing a window object within a computer-generated scene, the computer-generated scene including a pair of stereoscopic cameras adapted to capture an image of at least one computer-generated object and the window object, the system comprising:
   a memory;
   a processor for executing computer-readable instructions, the instructions for:
      obtaining a left portion and right portion of the image along the left and right edges of the image;
      identifying the nearest computer-generated object to the pair of stereoscopic cameras within the left and right portions of the image;
      placing the window object between the identified computer-generated object and the stereoscopic cameras at an offset distance from the identified computer-generated object; and
      storing, in the computer memory, the location of the window object.

9. The computer system of claim 8, the instructions further comprising,
   creating a stereoscopic image of the computer-generated scene with the pair of stereoscopic cameras, wherein a portion of the computer-generated object is hidden behind the stereo window; and
   storing, in the computer memory, the stereoscopic image.

10. The computer system of claim 8, wherein the window object separated from the computer-generated object by an offset that is less than a width of the computer-generated object.

11. The computer system of claim 8, wherein the left and right portions of the image are 48 pixels wide.

12. The computer system of claim 8, wherein the left and right portions of the image are 60 percent of height of the image.

13. The computer system of claim 8, wherein the window object comprises two vertical bar-shaped surfaces, and wherein the vertical bar-shaped surfaces are depicted, respectively, near a left and right edge portion of a stereoscopic image produced using the pair of stereoscopic cameras.

14. A computer system for placing a window object within a computer-generated scene, the computer-generated scene including a pair of stereoscopic cameras adapted to capture an image of at least one computer-generated object and the window object, the system comprising:
 a memory;
 a processor for executing computer-readable instructions, the instructions for:
  obtaining a timeline for a film sequence, the timeline comprising a plurality of time entries;
  for each of at least two time entries of the plurality of time entries:
   obtaining a left portion and right portion of the image along the left and right edges of the image;
   identifying the nearest computer-generated object to the pair of stereoscopic cameras within the left and right portions of the image;
   placing the window object between the identified computer-generated object and the stereoscopic cameras at an offset distance from the identified computer-generated object; and
   storing, in the computer memory, the location of the window object.

15. A non-transitory computer-readable storage medium including computer-readable instructions that when executed on a computer processor cause the computer processor to place a window object within a computer-generated scene, the computer-generated scene including a pair of stereoscopic cameras adapted to capture an image of at least one computer-generated object and the window object, the instructions comprising:
 obtaining a left portion and right portion of the image along the left and right edges of the image;
 identifying the nearest computer-generated object to the pair of stereoscopic cameras within the left and right portions of the image;
 placing the window object between the identified computer-generated object and the stereoscopic cameras at an offset distance from the identified computer-generated object; and
 storing, in the computer memory, the location of the window object.

16. The non-transitory computer-readable storage medium 19, the instructions further comprising, creating a stereoscopic image of the computer-generated scene with the pair of stereoscopic cameras, wherein a portion of the computer-generated object is hidden behind the stereo window; and storing, in the computer memory, the stereoscopic image.

17. The non-transitory computer-readable storage medium of claim 15, wherein the window object separated from the computer-generated object by an offset that is less than a width of the computer-generated object.

18. The non-transitory computer-readable storage medium of claim 15, wherein the left and right portions of the image are 48 pixels wide.

19. The non-transitory computer-readable storage medium of claim 15, wherein the left and right portions of the image are 60 percent of height of the image.

20. The non-transitory computer-readable storage medium of claim 15, wherein the window object comprises two vertical bar-shaped surfaces, and wherein the vertical bar-shaped surfaces are depicted, respectively near a left and right edge portion of a stereoscopic image produced using the pair of stereoscopic cameras.

21. A non-transitory computer-readable storage medium including computer-readable instructions that when executed on a computer processor cause the computer processor to place a window object within a computer-generated scene, the computer-generated scene including a pair of stereoscopic cameras adapted to capture an image of at least one computer-generated object and the window object, the instructions comprising:
 obtaining a timeline for a film sequence, the timeline comprising a plurality of time entries;
 for each of at least two time entries of the plurality of time entries:
  obtaining a left portion and right portion of the image along the left and right edges of the image;
  identifying the nearest computer-generated object to the pair of stereoscopic cameras within the left and right portions of the image;
  placing the window object between the identified computer-generated object and the stereoscopic cameras at an offset distance from the identified computer-generated object; and
  storing, in the computer memory, the location of the window object.

* * * * *